(12) United States Patent
Hidaka

(10) Patent No.: US 8,665,435 B2
(45) Date of Patent: Mar. 4, 2014

(54) WAVELENGTH DETECTOR AND CONTACT PROBE USING IT

(71) Applicant: Mitutoyo Corporation, Kawasaki (JP)

(72) Inventor: Kazuhiko Hidaka, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 0 days.

(21) Appl. No.: 13/733,356

(22) Filed: Jan. 3, 2013

(65) Prior Publication Data

US 2013/0176561 A1   Jul. 11, 2013

(30) Foreign Application Priority Data

Jan. 5, 2012 (JP) ................. 2012-000730

(51) Int. Cl.
*G01J 3/28* (2006.01)

(52) U.S. Cl.
USPC .......................................... 356/328

(58) Field of Classification Search
USPC ................. 356/300, 326, 328, 344
See application file for complete search history.

(56) References Cited

U.S. PATENT DOCUMENTS 8,378,257 B2 * 2/2013 Nomaru et al. .......... 219/121.67
2006/0053648 A1   3/2006 Ruijl et al.

FOREIGN PATENT DOCUMENTS

| DE | 102005037160 | 2/2007 |
| FR | 2950441 | 3/2011 |
| JP | 2007-218734 | 8/2007 |

OTHER PUBLICATIONS

Extended European Search Report, Application No. 13150004.3, dated Apr. 26, 2013, 6 pages.

* cited by examiner

*Primary Examiner* — Tarifur Chowdhury
*Assistant Examiner* — Abdullahi Nur
(74) *Attorney, Agent, or Firm* — Rankin, Hill & Clark LLP

(57) ABSTRACT

A contact probe includes a stylus and an optical detector configured to detect a posture of the stylus optically. An illumination subject portion is formed on the stylus and has three or more reflection surfaces. The optical detector includes three or more fibers, a light source, a condenser lens group, and a wavelength detector. The wavelength detector calculates posture information of the stylus on the basis of wavelength variations of reflection light beams that are caused by variations of intervals between the condenser lens group and the three or more reflection surfaces, respectively. The contact probe acquires coordinates of a position of the contact to the object to be measured on the basis of posture information obtained by the optical detector.

9 Claims, 7 Drawing Sheets

REFERENCE POSTURE
BEFORE ENVIRONMENTAL
CHANGE

REFERENCE POSTURE
AFTER ENVIRONMENTAL
CHANGE

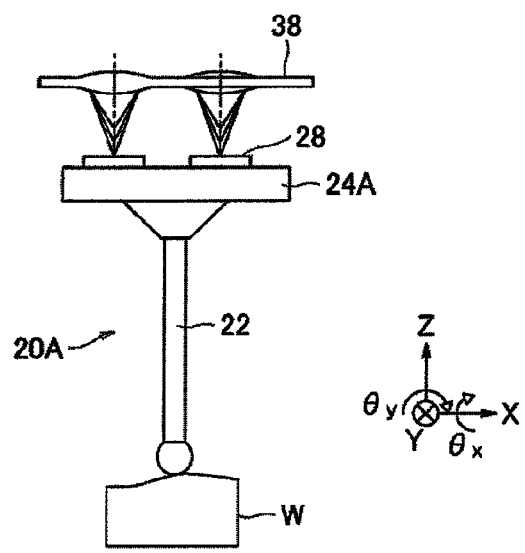
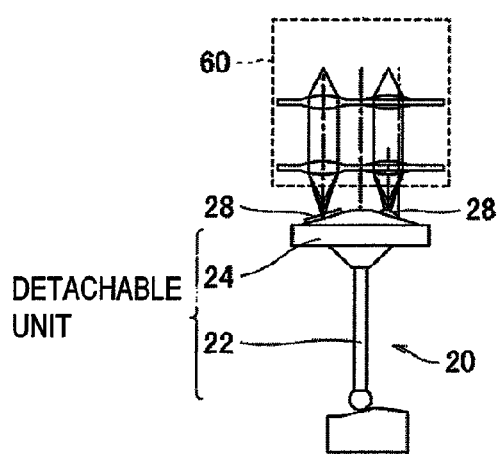
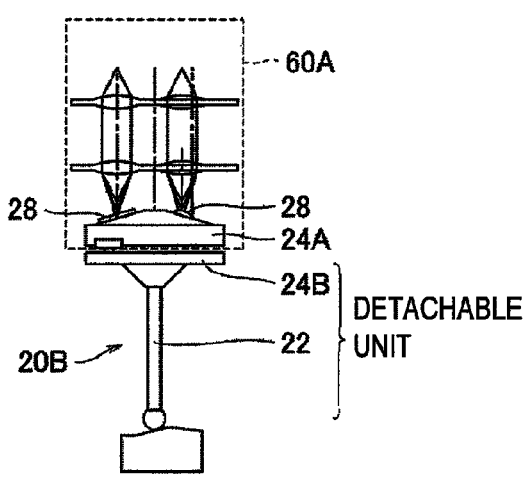

FIG. 10A
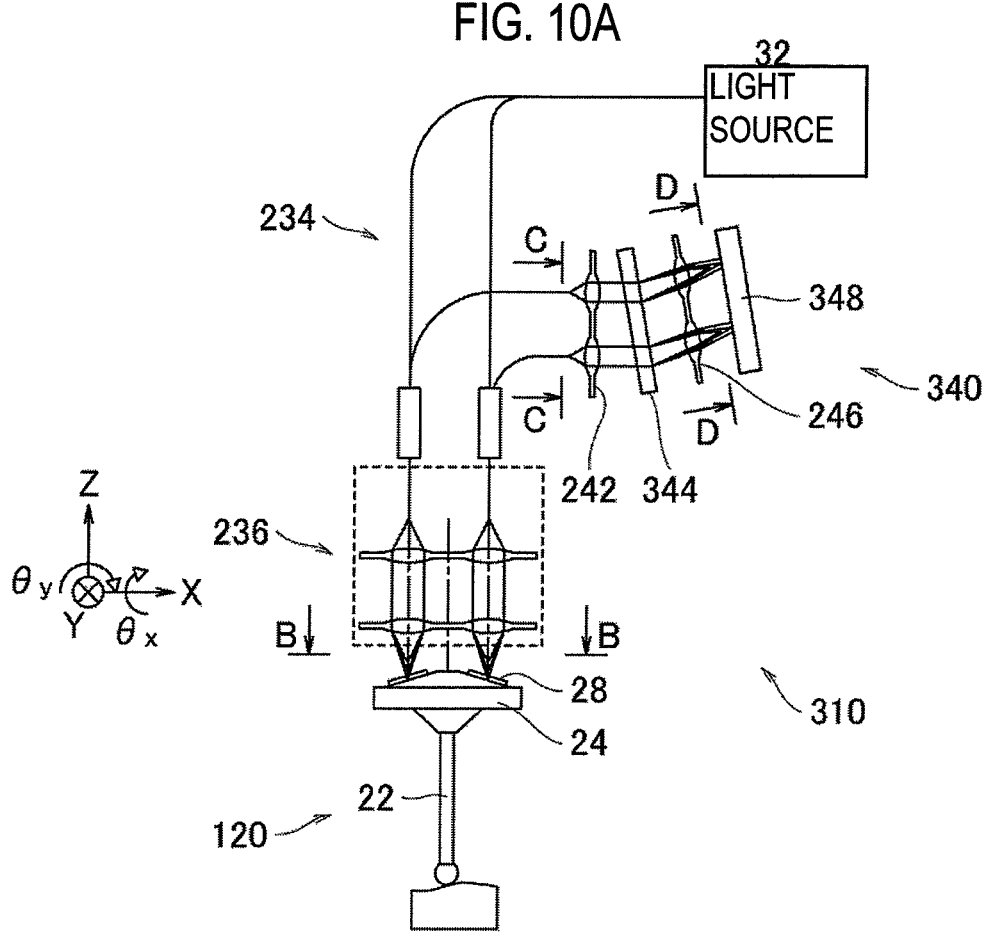
FIG. 10B  FIG. 10C  FIG. 10D
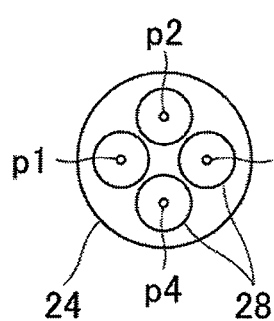 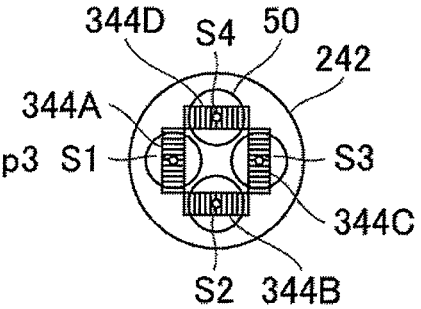 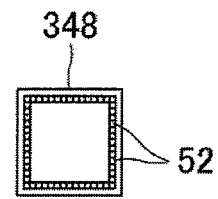

WAVELENGTH DETECTOR AND CONTACT PROBE USING IT

CROSS-REFERENCE TO RELATED APPLICATION(S)

The present application claims the benefit of priority of Japanese Patent Application No. 2012-000730, filed on Jan. 5, 2012. The disclosures of this application are incorporated herein by reference.

BACKGROUND

1. Technical Field

The present invention relates to a light wavelength detector and contact probes using it. More particularly, the invention relates to contact probes such as a scanning probe and a touch trigger probe for coordinate measuring machines.

2. Related Art

Contact probes for coordinate measuring machines have various types, examples of which are an optical detection type in which a posture of a stylus (movable body) is triangulated, another optical detection type in which a movement length of a movable body is detected on a linear scale, and a type in which a posture of a movable body is detected by detecting an amount of strain by disposing an electrostrictive element in an elastic deformation portion of the movable body. Such a stylus posture detector is disposed as an internal sensor inside the housing of a contact probe. For example, light beams emitted from three LEDs are caused to shine on three reflection surfaces of a reflection mirror which is disposed in a top portion of a stylus and resulting three reflection light beams are detected by a photosensor. When the posture of the stylus is varied, the reflection mirror is displaced, whereby the reflection directions of the three respective reflection light beams are varied and their incident positions on the photosensor are shifted accordingly. A posture variation of the stylus is calculated by detecting shift lengths of the respective reflection light beams. Such a stylus posture optical detection method using light beams emitted from LEDs is disclosed in Patent document 1, for example.

PRIOR ART DOCUMENTS

Patent Documents

[Patent document 1] JP-A-2007-218734

However, in the optical detection methods, in a current situation that scanning probes are being increased in accuracy, thermal deformation of a probe caused by heat sources inside the probe such as a light source and a photodetecting element group is an unnegligible error-causing factor in submicron order measurements. On the other hand, one common measure for increasing the S/N ratio in the optical detection methods is to dispose the photodetecting element group as close to the movable body as possible. Thus, in the optical detection methods, the problem of the thermal deformation of the movable body due to heat sources and the issue of the S/N ratio are in a tradeoff relationship.

In the optical detection method using triangulation, two-segment or four-segment PSDs (position sensor devices) are widely used as photodetectors. Although PSDs provide an advantage of high-speed detection, they have a problem that it is difficult to separate posture data of a movable body from electrical noise and vibration noise because PSDs detect the center of gravity of a light quantity distribution. Furthermore, PSDs are insufficient in functionality for the purpose of detection of a posture of an object to be measured.

In the method using an electrostrictive element typically made of PZT, this piezoelectric element is generally difficult to handle because it is prone to be damaged by impact and makes it difficult to replace a stylus.

SUMMARY

One or more exemplary embodiments of the present invention provide a wavelength detector capable of detecting different wavelengths of three or more light beams and a contact probe which can optically detect a posture of a stylus using such a wavelength detector.

A wavelength detector according to an exemplary embodiment of the invention comprises:

a parallel lens group configured to convert light beams having partial wavelength ranges, which are extracted from three or more reflection light beams produced by irradiating with three or more illumination light beams having a spectrum in a prescribed wavelength range to three or more reflection surfaces of an illumination subject portion, into light beams that are parallel with each other using three or more lenses;

a spectroscope element configured to receive the light beams coming from the parallel lens group, and to output the light beams in exit directions corresponding to their partial wavelength ranges, respectively;

a detection lens group configured to condense the output light beams of the spectroscope element using three or more lenses, respectively; and a photodetecting element group configured to detect focusing positions of three or more light beams condensed by the detection lens group, respectively, the photodetecting element group comprising a plurality of photodetecting elements which are arranged in a single plane and cover variation ranges of the focusing positions, depending on the exit directions from the spectroscope element, of the three or more light beams condensed by the detection lens group, wherein the wavelength detector calculates wavelengths of the three or more light beams on the basis of the respective detected focusing positions.

With this configuration, wavelengths of three or more light beams can be detected simultaneously. More specifically, wavelengths of light beams are determined by detecting their focusing positions.

The spectroscope element causes three or more light beams coming from the parallel lens group to travel in directions that depend on their wavelengths. Since the parallel lens group is used, three or more light beams that are parallel with each other can be produced efficiently even from light beams emitted from optical fibers or the like. The spectroscope element may be a prism or a diffraction grating. In particular, to save space, it is preferable to employ a diffraction grating.

The detection lens group is disposed on the exit side of the spectroscope element. Output light beams of the spectroscope element are condensed by the corresponding lenses of the detection lens group and thereby focused on the photodetecting surface of the photodetecting element group which is disposed downstream of the photodetecting element group.

Furthermore, since the photodetecting element group is of a multi-element type (i.e., it consists of plural photodetecting elements), intensity of each light beam condensed onto the photodetecting element group is detected by plural photodetecting elements. Therefore, an intensity distribution that spreads over plural photodetecting elements centered by a focusing position is obtained and the focusing position can be detected as its peak position. If plural photodetecting elements are arranged in a single plane and three light beams are caused to shine on the photodetecting element group with such a positional relationship that they do not interfere with each other, wavelengths of the three light beams can be detected simultaneously and independently. The photodetecting element group may employ either photodetecting element arrays (called line image sensors) in each of which plural photodetecting elements are arranged in line or an area sensor such as a CCD.

Since the parallel lens group and the detection lens group are used, each of the spectroscope element and the photodetecting element group can be a single, common component. That is, it is not necessary to provide separate spectroscope elements and separate photodetecting element groups for three or more respective light beams. Therefore, time and labor of alignment work can be saved that would be necessary if separate spectroscope elements and separate photodetecting element groups were provided. And influences of detection errors can be eliminated that would be caused by differences in optical characteristics between the individual 1 elements and alignment errors of the individual elements. As such, the invention makes it possible to detect wavelengths of three or more light beams simultaneously with high accuracy with a simple configuration consisting of optical elements.

The photodetecting element group may comprise a plurality of photodetecting element arrays which are arranged in the single plane and in each of which a plurality of photodetecting elements are arranged in line.

The inventors paid attention to the fact that determination (detection) of a wavelength of light by detecting a peak position of its intensity distribution can be attained by at least one photodetecting element array, and has applied this fact to detection of wavelengths of three or more light beams. That is, the inventors have employed the photodetecting element group in which plural photodetecting element arrays are arranged on a photodetecting surface so that each light beam can be detected by at least one photodetecting element array. With this photodetecting element group, the number of necessary photodetecting elements can be made much smaller than in the case of using a photodetecting device such as a CCD in which photodetecting elements are arranged over the entire photodetecting surface without gaps, whereby signal processing times that would otherwise be consumed by useless photodetecting elements can be saved. As a result, the signal processing speed and hence the measurement speed can be increased.

Each of the plurality of photodetecting element arrays may comprise a plurality of photodetecting elements that are arranged in such a direction as to cover a variation range of the exit direction that depends on the wavelength of the corresponding output light beam of the spectroscope element, and serves for determination of a wavelength of the corresponding light beam condensed by the detection lens group.

With this configuration, each photodetecting element array covers a range of possible focusing positions of light coming from the corresponding lens of the detection lens group, and serves for determination of a wavelength of a light beam corresponding to the photodetecting element array. That is, a wavelength of each light beam is detected by one photodetecting element array. This ensures that an event that a light beam is focused on a portion, having no photodetecting elements, of the photodetecting surface is prevented.

A contact probe according to an exemplary embodiment of the invention, comprises:

a stylus held so that its posture varies according to a manner of contact of its tip portion to an object to be measured;

an optical detector configured to detect a posture of the stylus optically; and an illumination subject portion formed on the stylus and illuminated by the optical detector, the illumination subject portion having three or more reflection surfaces, wherein the optical detector comprises:

three or more fibers configured to transmit illumination light beams toward the respective reflection surfaces, a light source configured to supply the illumination light beams having a spectrum in a prescribed wavelength range to the respective optical fibers, a condenser lens group configured to condense the illumination light beams coming from the respective fibers onto the respective reflection surfaces by condenser lenses disposed on optical axes extending between the fibers and the corresponding reflection surfaces, and a wavelength detector according to any one of claims 1 to 4 configured to receive reflection light beams reflected from regions of the reflection surfaces, located in the vicinities of focusing positions of components, having partial wavelength ranges, of the illumination light beams via the fibers, respectively, and to detect wavelengths of the respective reflection light beams, wherein the wavelength detector is configured to calculate posture information of the stylus on the basis of wavelength variations of the reflection light beams that are caused by variations of intervals between the condenser lens group and the three or more reflection surfaces, respectively, and wherein the contact probe acquires coordinates of a position of the contact to the object to be measured on the basis of posture information obtained by the optical detector.

With this configuration, heat sources such as the light source and the photodetecting element group can be isolated from the housing of a probe body and a measurement can be performed with high accuracy even if the heat sources are isolated. Furthermore, the contact probe can be handled easily.

The three or more reflection surfaces may be disposed on a conical surface or an inverted conical surface, whose axis coincides with a probe axis, of the illumination subject portion.

The three or more reflection surfaces may be arranged in a flat plane, perpendicular to a probe axis, of the illumination subject portion.

BRIEF DESCRIPTION OF THE DRAWINGS

FIG. 6 shows a modified version of the contact probe according to the embodiment.

FIG. 7A shows a detachable unit of the contact probe according to the embodiment, and FIG. 7B shows a modified version of the detachable unit.

FIGS. 10A-10D show the configuration of a further modified version of the contact probe according to the embodiment in which four photodetecting element arrays extend along the four sides of a square.

DETAILED DESCRIPTION

A contact probe 10 according to an embodiment of the present invention will be hereinafter described with reference to the drawings.

Figure 1A:
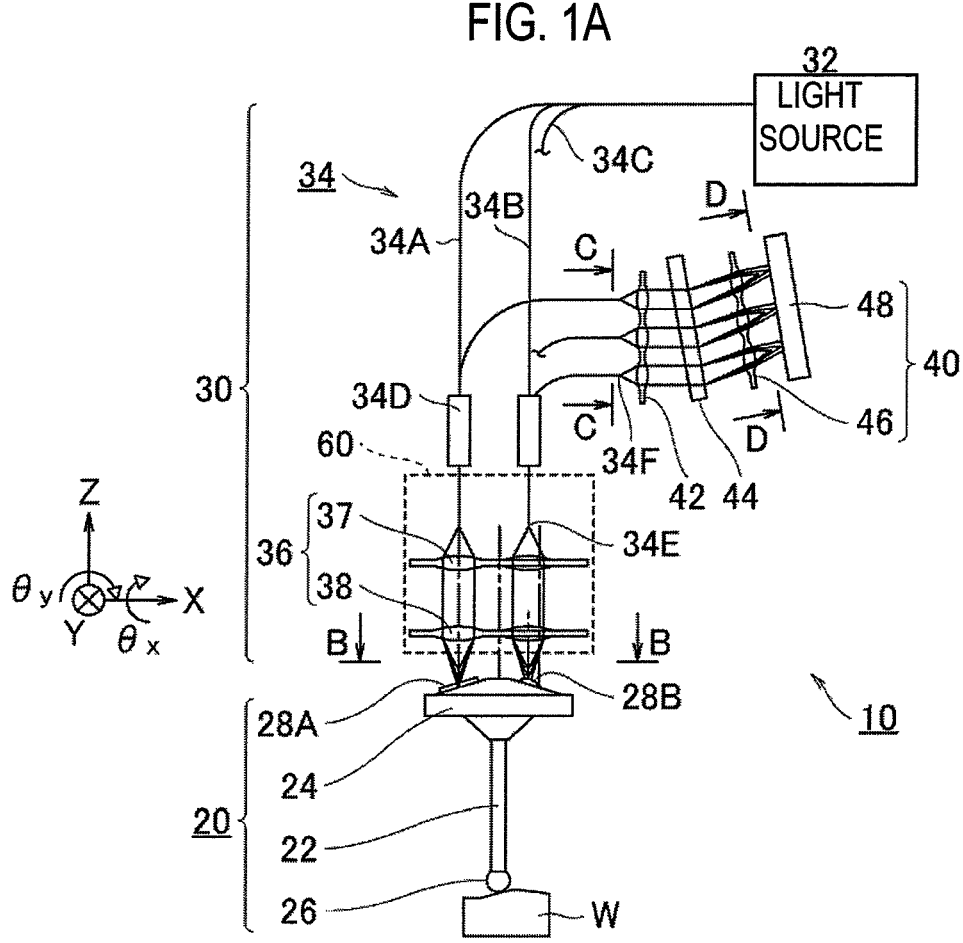
FIG. 1A shows the overall configuration of a contact probe according to an embodiment of the present invention.

The contact probe 10 shown in FIGS. 1A-1D is a scanning probe for a coordinate measuring machine. As shown in FIG. 1A, the contact probe 10 is equipped with a movable body 20 whose posture is varied freely when it is in contact with an object W to be measured and an optical detector 30 for detecting a posture of the movable body 20 optically. The contact probe 10 acquires the coordinates of a contact position of the object W to be measured from its posture information. Since the contact probe 10 is a scanning probe, as the contact probe 10 is moved across the surface of the object W to be measured while the movable body 20 is kept in contact with the object W, postures of the movable body 20 are detected continuously and surface properties (roughness information, undulation information, etc.) of the object W can be measured. The contact probe 10 according to the invention can be used as a touch trigger probe.

<Movable Body>

The movable body 20 is composed of a stylus 22 and an illumination subject portion 24 which is disposed on top of the stylus 22. A contact portion 26 as a bottom portion of the stylus 22 is brought into contact with the object W to be measured and its posture is varied according to its contact state. The illumination subject portion 24 is integral with the stylus 22 and is illumination subject portion which is illuminated by the optical detector 30. A holding mechanism of the stylus 22 will not be described in detail; for example, the illumination subject portion 24 may be held by a housing 60 of a probe body using a support plate having cuts (refer to Patent document 1). When the contact portion 26 of the stylus 22 is brought into contact with the object W to be measured, the posture of the stylus 22 is varied freely because of elastic deformation of the support plate.

The illumination subject portion 24 has a conical top portion. Reflection surfaces 28 are rough surfaces formed on this conical surface at three positions. This is to prevent illumination light from being reflected only at a particular reflection angle and, instead, to cause most of the illumination light to be scattered by the surface and thereby increase the posture (angle) detectable range with respect to the inclination angle of the movable body 20.

<Optical Detector>

The optical detector 30 is composed of a light source 32, a fiber transmission unit (three or more fibers) 34, a condenser lens group 36, and a wavelength detector 40. The light source 32 supplies the fiber transmission unit 34 with illumination light whose spectrum is in a prescribed wavelength range, such as white light.

The fiber transmission unit 34 has three fiber paths 34A-34C. The first path 34A is a path along which illumination light is transmitted from the light source 32 to a first reflection surface 28A and reflection light is transmitted from the first reflection surface 28A to the wavelength detector 40. A branching member 34D is provided at a halfway position in the first path 34A, and both of the illumination light and the reflection light passes through a fiber portion between the branching member 34D and the condenser lens group 36. Like the first path 34A, each of the second path 34B and the third path 34C transmits illumination light from the light source 32 to a second reflection surface 28B or a third reflection surface 28C and transmits reflection light from the second reflection surface 28B or the third reflection surface 28C to the wavelength detector 40. The tips of the three fibers as the exits of illumination light beams are disposed over the illumination subject portion 24 of the movable body 20 at intervals of 120° around the probe axis (the longitudinal center axis of the stylus 22).

The condenser lens group 36 is composed of condenser lenses which are disposed on the optical axes between the fibers and the corresponding reflection surfaces 28, and condense illumination light beams emitted from the fibers onto the reflection surfaces 28, respectively. In the embodiment, the condenser lens group 36 consists of two sets of lens arrays 37 and 38. The first-stage lens array 37 condenses illumination light beams emitted from the exits of the fibers to form parallel straight light beams. The second-stage lens array 38 condenses the straight light beams onto the respective reflection surfaces 28.

A description will now be described of how a position adjustment of the second-stage lens array 38 is performed. The position of the second-stage lens array 38 relative to the reflection surfaces 28 is adjusted so that illumination light beams that are output from the second-stage lens array 38 are focused on the respective reflection surfaces 28 in a state that the stylus 22 has a reference posture. The reference posture means a posture in a state that the contact portion 26 of the stylus 22 is not in contact with the object W to be measured, that is, no external force is acting on the movable body 20.

Since illumination light beams have the spectrum in the prescribed wavelength range, the focusing positions of the illumination light beams that are output from the condenser lens group 36 vary along their optical axes depending on the wavelength, to produce focusing position ranges. Therefore, strictly, the adjusting method depends on the use condition of the contact probe 10, that is, the focusing positions of components in what wavelength range should be set on the reflection surfaces 28. For example, the focusing positions of components, in a central wavelength range, of illumination light beams may be set on the reflection surfaces 28 in a state that the stylus 22 has the reference posture. This method is suitable for detection of posture variations from the reference position of the stylus 22. Alternatively, the focusing positions of components, in a central wavelength range, of illumination light beams may be set on the reflection surfaces 28 in a state that the stylus 22 has a "neutral posture" with which the contact portion 26 is in contact with the object W to be measured at a prescribed pressing force, rather than in the state that the stylus 22 has the reference posture. This method is suitable for a case that the surface of the object W to be measured is scanned with the contact portion 26.

In the embodiment, in the condenser lens group 36, the lenses are arranged so as to set the optical axes of illumination light beams parallel with each other. That is, the optical axes that connect the fiber exits 34E and the centers of the reflection surfaces 28 are parallel with each other. However, these optical axes need not always be parallel with each other, because in the invention a posture of the stylus 22 is detected by measuring intervals between the second-stage lens array 38 and the respective reflection surfaces 28 and hence a posture can be detected even if the three optical axes are not parallel with each other. However, setting the three optical axes parallel with each other as in the embodiment can make the housing 60 of the probe body compact because the intervals between the optical axes are minimized and hence lens intervals of the lens arrays 37 and 38 are reduced.

Although in the embodiment the three fiber exits 34E are located over the illumination subject portion 24 of the movable body 20, the following modification is possible. The illumination subject portion 24 of the movable body 20 is given a conical shape whose apex is located on the bottom side, and the three reflection surfaces 28 are formed on this inverted conical surface. The three fiber exits 34E are disposed under the illumination subject portion 24, and illumination light beams are emitted upward so as to reach the respective reflection surfaces 28.

Figure 1B:
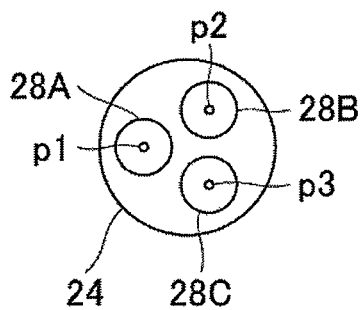
FIGS. 1B-1D illustrate the principle of detection of a posture of a stylus of the contact probe.

FIG. 1B is a top view of the movable body 20 as viewed from above in the Z axis. The circular reflection surfaces 28 are arranged on the conical surface of the illumination subject portion 24 at intervals of 120° around the probe axis. The condenser lens group 36 condenses illumination light beams onto the reflection surfaces 28 (their centers are targeted). Illumination positions on the reflection surfaces 28A-28C are denoted by symbols p1-p3, respectively.

<Wavelength Detector>

Next, the wavelength detector 40 which is an important feature of the invention will be described with reference to FIGS. 1A-1C.

The wavelength detector 40 receives, via the fibers, reflection light beams reflected from regions, in the vicinities of the focusing positions of illumination light beams, of the reflection surfaces 28, and detects wavelengths of the respective reflection light beams. More specifically, the wavelengths at which illumination light beams are focused on the reflection surfaces 28 are determined according to the positional relationships between the second-stage lens array 38 and the reflection surfaces 28, respectively, and reflection light beams having those respective wavelengths are condensed by the condenser lens group 36. The wavelength detector 40 detects wavelength variations of the reflection light beams that are caused by variations in the intervals between the second-stage lens array 38 and the reflection surfaces 28, respectively, and calculates posture information of the stylus 22 on the basis of the detected wavelength variations.

The wavelength detector 40 is composed of a parallel lens group 42, a diffraction grating (spectroscope element) 44, a detection lens group 46, and a photodetecting element group 48.

Figure 1C:
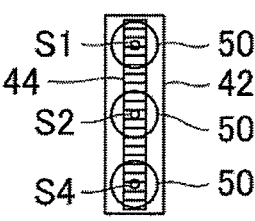

FIG. 1C shows the parallel lens group 42 and the diffraction grating 44 as viewed from the reflection light incidence side. For the sake of convenience, the parallel lens group 42 and the diffraction grating 44 are shown in superimposition in FIG. 1C. As shown in FIG. 1C, the parallel lens group 42 is a lens array in which three lenses 50 are mounted on a rectangular frame member so as to be arranged in line. The fiber exits 34F from which reflection light beams are output are disposed so as to face the respective lenses 50 of the parallel lens group 42. In the embodiment, the optical axes of the fibers coincide with those of the lenses 50, respectively. In FIG. 1C, symbols S1-S3 denote the optical axes of three reflection light beams, respectively. The parallel lens group 42 produces three reflection light beams which travel parallel with each other.

The diffraction grating 44 is shaped like a rectangular plate, and may be a diffraction grating having a large number of parallel grooves formed at a constant pitch. The positional relationship between the parallel lens group 42 and the diffraction grating 44 is adjusted so that the optical axes of at least three reflection light beams which are parallel with each other pass through the diffraction grating 44 at the same time. In the embodiment, the angle α of incidence, on the diffraction grating 44, of reflection light beams is fixed at a value larger than 0°. Or the incident angle a may be fixed at 0°. The diffraction grating 44 receives each reflection light beam from the parallel lens group 42 and outputs strong transmission light in a refraction direction that depends on the wavelength of the received reflection light beam. Therefore, each light beam that has passed through the diffraction grating 44 is detected most strongly in the direction of the diffraction angle that depends on its wavelength. Although the embodiment employs the transmission diffraction grating 44, the same effect can be obtained even if a reflection diffraction grating is used and the detection lens group 46 and the photodetecting element group 48 are disposed on its diffraction side.

The detection lens group 46 is disposed on the exit side of the diffraction grating 44, and condenses transmission light beams coming from the diffraction grating 44. The detection lens group 46 is a lens array in which three lenses are arranged in line, and may be the same lens array as the parallel lens group 42. Light beams coming from the diffraction grating 44 are condensed by the corresponding lenses of the detection lens group 46 and thereby focused on the photodetecting surface of the photodetecting element group 48 which is disposed downstream of the detection lens group 46. The diffraction direction of each transmission light beam of the diffraction grating 44 depends on the wavelength, and each lens of the detection lens group 46 is given such a size as to be able to condense light traveling in any direction.

Figure 1D:
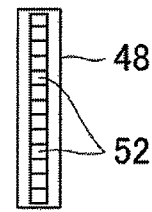

The photodetecting element group 48 detects focusing positions (i.e., diffraction directions) of transmission light beams of the diffraction grating 44. FIG. 1D is a view of the photodetecting element group 48 as viewed from the incidence side. As shown in FIG. 1D, the photodetecting element group 48 is a photodetecting element array in which plural photodetecting elements are arranged in line. This photodetecting element array is divided into three regions, and three transmission light beams of the diffraction grating 44 are detected in the three respective regions. That is, the photodetecting element array in each region covers a focusing position (diffraction direction) range of the corresponding transmission light beam of the diffraction grating 44. Therefore, each transmission light beam of the diffraction grating 44 is focused on at least one photodetecting element 52. The photodetecting element array is mounted on a rectangular substrate. Focusing positions are calculated on the basis of pieces of photodetection intensity information of the respective photodetecting elements 52, and wavelengths of the diffraction light beams are calculated on the basis of the calculated focusing positions, respectively. Wavelength variations are obtained and a posture variation of the stylus 22 is derived. These pieces of calculation processing may be performed by a calculating means (not shown).

<Principle of Detection>

The principle of detection of a posture of the stylus 22 using the above-configured contact probe 10 will be described below with reference to FIGS. 2A-2D to FIGS. 4A-4D. The following description will be directed to a case that a posture variation (a movement in the Z-axis direction (vertical direction), a rotation around the X axis, and a rotation around the Y axis) of the movable body 20 is detected using the contact probe 10 as a scanning probe.

Figure 2A:
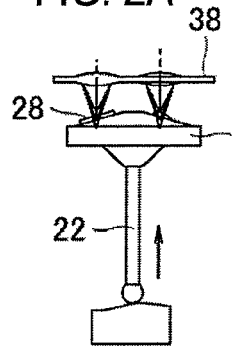
FIGS. 2A-2D illustrate the principle of detection of a posture variation of the stylus when it has been moved upward in the vertical direction.
Figure 2B:
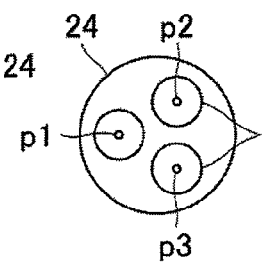

First, a description will be made of the principle of detection in the case of a movement in the vertical direction. When the movable body 20 has been moved upward in the vertical direction, as shown in FIG. 2A all of the illumination positions p1-p3 on the reflection surfaces 28 move upward. FIG. 2B shows is a plan view showing an arrangement of the illumination positions p1-p3. In this case, wavelengths at which illumination light beams are focused on the respective reflection surfaces 28 are shorter than a wavelength at which illumination light beams are focused on the respective reflection surfaces 28 in a state that the stylus 22 has the neutral posture. And a component of each illumination light beam having such a wavelength as to be focused on the corresponding reflection surface 28 is condensed most by the second-stage lens array 38 and hence produces a highest-intensity transmission light component of the diffraction grating 44 shown in FIG. 1C. As described above, when the movable body 20 has been moved upward in the vertical direction, a component of each transmission light beam having a shorter wavelength than the focusing wavelength corresponding to the neutral posture of the stylus 22 shines on the photodetecting element group 48 most strongly.

Figures 2C, 2D:
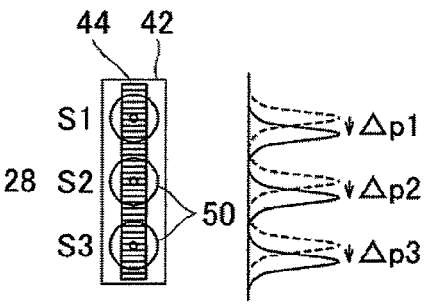

The transmission diffraction grating 44 produces a strong component of each diffraction light beam in the direction of a diffraction angle corresponding to the above wavelength. In the case of FIGS. 2A-2D in which all of three light beams incident on the diffraction grating 44 have shorter wavelengths, diffraction light beams having smaller diffraction angles shine on the photodetecting element group 48. As a result, when the movable body 20 has been moved upward, a light intensity distribution indicated by a solid line in FIG. 2D is obtained on the photodetecting element array (a light intensity distribution corresponding to the neutral posture is indicated by a broken line). All of the three peak positions on the photodetecting element array are moved downward by displacements $\Delta p1$, $\Delta p2$, and $\Delta p3$.

Figure 3A:
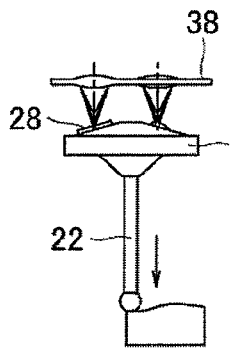
FIGS. 3A-3D illustrate the principle of detection of a posture variation of the stylus when it has been moved downward in the vertical direction.
Figure 3B:
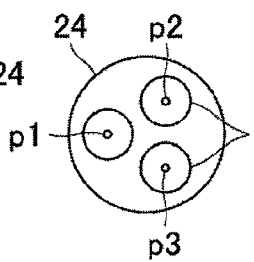
Figures 3C, 3D:
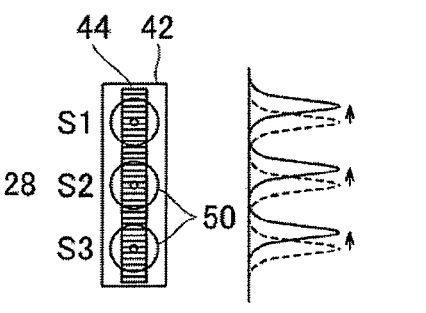

When the movable body 20 has been moved downward in the vertical direction as shown in FIG. 3A, all of the three peak positions on the photodetecting element array are moved upward as indicated by a solid line in FIG. 3D from the ones corresponding to the neutral position indicated by a broken line. This is because when the movable body 20 has been moved downward, light beams having longer wavelengths are incident on the diffraction grating 44 and hence resulting diffraction light beams have larger diffraction angles.

When the movable body 20 has been moved in the vertical direction, the displacements $\Delta p1$, $\Delta p2$, and $\Delta p3$ of the peak positions on the photodetecting element array of the photodetecting element group 48 are identical ($\Delta p1 = \Delta p2 = \Delta p3$).

Next, a description will be made of the principle of detection in the case where the movable body 20 has been inclined, that is, the movable body 20 has been rotated around the X axis, Y axis, or both.

Figure 4A:
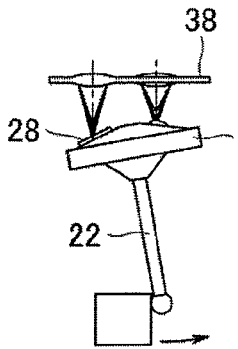
FIGS. 4A-4D illustrate the principle of detection of a posture variation of the stylus when it has been inclined.

For the sake of convenience, a description will be made of a case that the movable body 20 has been rotated around the Y axis by an angle $\theta y$ as shown in FIG. 4A. Among the illumination positions p1-p3 on the reflection surfaces 28, the illumination position p1 is moved downward and the illumination positions p2 and p3 are moved upward. As for the illumination position p1, illumination light is focused on the reflection surface 28A at a longer wavelength than the focusing wavelength corresponding to the neutral posture. As a result, longer-wavelength light having a larger diffraction angle shines on the photodetecting element group 48 and hence the peak position, on the photodetecting element array, of the refraction light corresponding to the illumination position p1 is moved upward as shown in FIG. 4D. On the other hand, as for each of the illumination positions p2 and p3, illumination light is focused on the reflection surface 28B or 28C at a shorter wavelength than the focusing wavelength corresponding to the neutral posture. As a result, shorter-wavelength light having a smaller diffraction angle shines on the photodetecting element group 48 and hence the peak position, on the photodetecting element array, of the refraction light corresponding to the illumination position p2 or p3 is moved downward as shown in FIG. 4D.

Figure 4B:
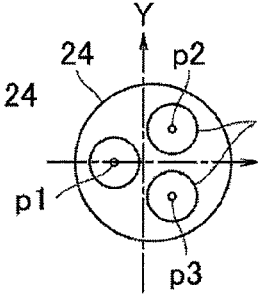
Figures 4C, 4D:
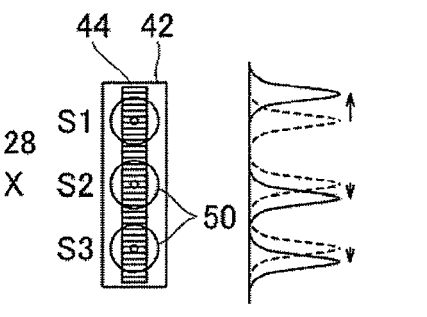

The X, Y and Z axes are shown in FIG. 4B (the Z axis is shown as the intersection of the X and Y axes). In the embodiment, the illumination positions p1-p3 are arranged at intervals of 120° around the probe axis and the illumination position p1 is located on the X axis (see FIG. 4B). Because of the distances of the illumination positions p1-p3 from the Y axis, the downward displacement of the illumination position p1 and the upward displacement of the illumination positions p2 and p3 have a ratio 2:1. This ratio appears in the relationship between the peak position displacement $\Delta p1$ and that of $\Delta p2$ and $\Delta p3$; that is, the peak position displacements $\Delta p1$, $\Delta p2$, and $\Delta p3$ have a ratio 2:(−1):(−1) (the minus sign means that the displacement directions are opposite).

The same principle of peak position movement applied to the case that the movable body 20 is rotated around the X axis. Consideration will be given to a case that the movable body 20 has been rotated around the X axis by an angle $\theta x$, that is, the stylus 22 has been inclined from its neutral posture (shown in FIG. 1A) and the contact portion 26 has been moved slightly toward the deep side in FIG. 1A (i.e., toward the positive side in the Y-axis direction). In this case, among the illumination positions p1-p3 on the reflection surfaces 28, the illumination position p1 is not moved at all, the illumination position p2 is moved upward, and the illumination position p3 is moved downward. Therefore, on the photodetecting element array, the diffraction light peak position corresponding to the illumination position p1 is not moved at all, the diffraction light peak position corresponding to the illumination position p2 is moved downward, and the diffraction light peak position corresponding to the illumination position p3 is moved upward. When the movable body 20 has been rotated around the X axis by an angle $\theta x$ that is the same as the above-mentioned rotation angle $\theta y$ around the Y axis, the peak position displacements $\Delta p1$, $\Delta p2$, and $\Delta p3$ have a ratio $0:(-\sqrt{3}):\sqrt{3}$.

Based on the above-described relationships, when the movable body 20 has been rotated around the X axis, the Y axis, or both, an inclination of the movable body 20 can be determined uniquely by calculating distances between the reflection surfaces 28 and the confronting condenser lenses of the second-stage lens array 38 on the basis of detection values of peak position displacements $\Delta p1$, $\Delta p2$, and $\Delta p3$. That is, information of a posture of the movable body 20 (i.e., a displacement of the stylus 22 in the vertical direction and an inclination of the stylus 22) can be derived by detecting peak position displacements $\Delta p1$, $\Delta p2$, and $\Delta p3$.

The use of the above-described wavelength detector 40 makes it possible to detect wavelengths of three reflection light beams simultaneously and independently. The wavelength detector 40 can be constructed by a small number of optical elements. Furthermore, wavelength variations can be detected with high accuracy.

In particular, since exit light beams of the fibers which transmit reflection light beams are detected by the single photodetecting element group 48 via the single diffraction grating 44 (or prism), posture detection errors that are caused by differences between the individual optical elements and alignment errors of the individual optical elements can be reduced.

Where the wavelength detector 40 is used as an internal sensor of the contact probe 10, a posture of the stylus 22 can be detected with high accuracy whereas heat sources such as the light source 32 and the photodetecting element group 48 need not be disposed inside the housing 60 of the probe body.

Furthermore, since the diameters of the fibers are on the order of sub-millimeters, a compact contact probe 10 having a millimeter-order diameter can be realized.

Figure 5A:
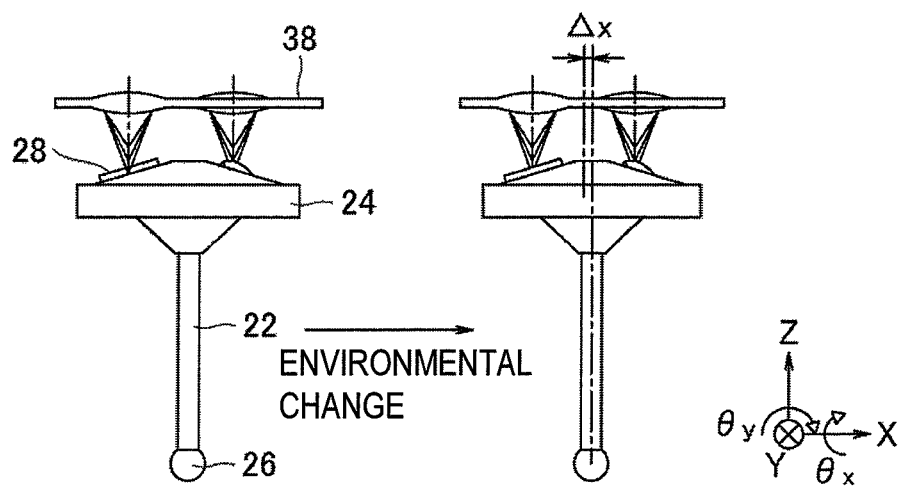
FIGS. 5A and 5B illustrate the principle of detection of a posture variation of the stylus due to an environmental change.
Figure 5B:
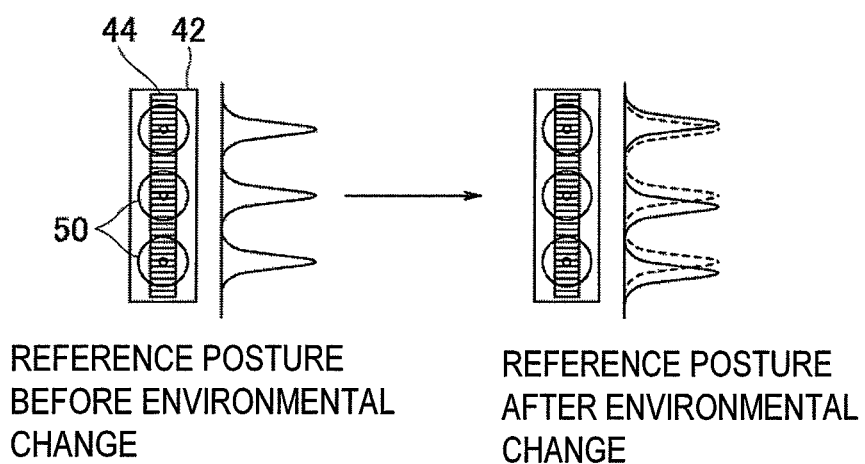
Figure 8A:
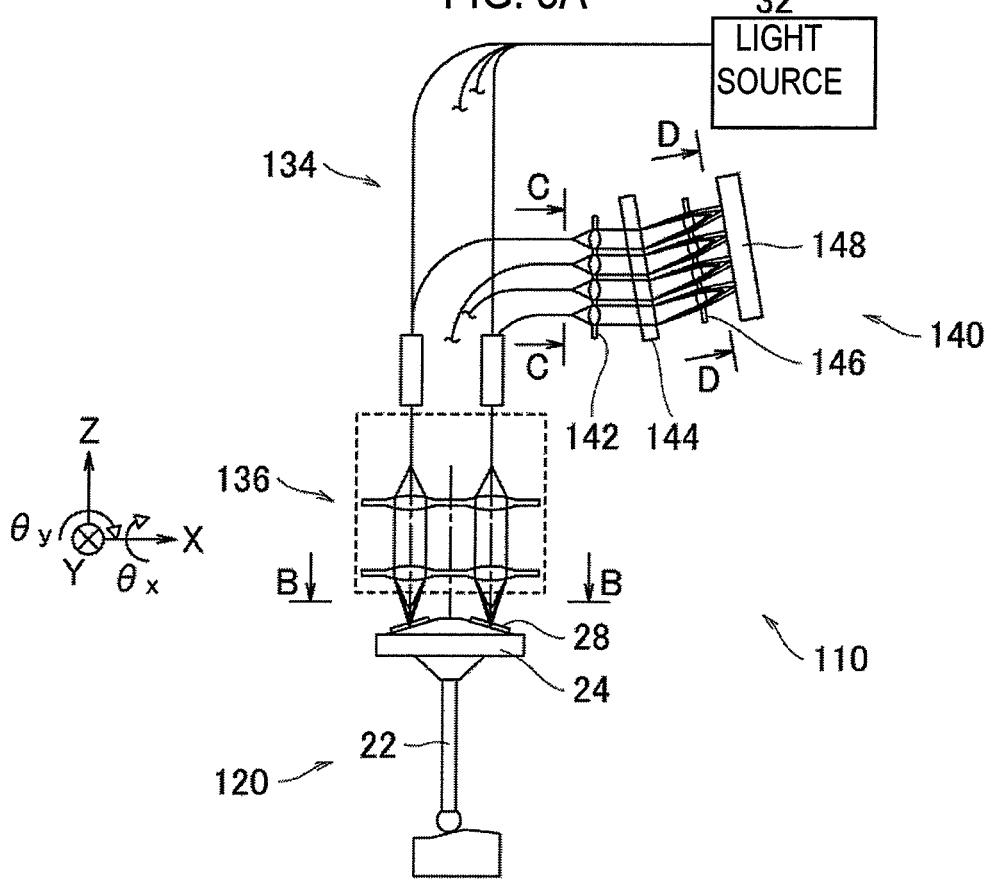
FIGS. 8A-8D show the configuration of another modified version of the contact probe according to the embodiment in which a movable body has four reflection surfaces.
Figure 8B:
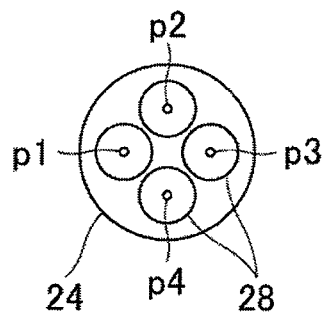
Figure 8C:
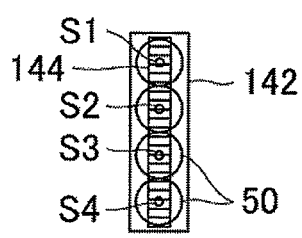
Figure 8D:
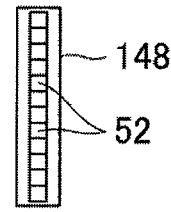

Since as described above the wavelength detector 40 is to measure distances between the reflection surfaces 28 and the confronting condenser lenses of the second-stage lens array 38 along the axes of the fibers, respectively, a variation in the reference posture of the movable body 20 due to a change in the measurement environment can be detected by disposing the reflection surfaces 28 on a conical surface (or inverted conical surface) whose axis coincides with the probe axis as in the embodiment. For example, when the reference posture of the movable body 20 has varied in such a manner that it has translated in the X-axis direction by a length $\Delta x$ due to a change in the measurement environment as shown in FIG. 5A, the translation length $\Delta x$ can be detected on the basis of displacements $\Delta p1$, $\Delta p2$, and $\Delta p3$ by comparing sets of peak positions before and after the change in the measurement environment as shown in FIG. 5B. Likewise, a variation length $\Delta y$ in the Y-axis direction or a variation length $\Delta z$ in the Z-axis direction due to a change in the measurement environment can be detected. In this manner, if the detection signals of the photodetecting element group 48 have changed though the contact portion 26 of the stylus 22 is not in contact with the object W to be measured, it can be judged that the current reference posture of the movable body 20 is different from the initial one. Thus, in the contact probe 10 according to the embodiment, a variation in the reference posture of the movable body 20 can be detected.

One application of the above concept will be described below. As long as the reference posture of the movable body 20 in a non-contact state is measured all the time, even if the position of the contact portion 26 of the stylus 22 has deviated from a position that was obtained at the time of a regular calibration, variation lengths $\Delta x$, $\Delta y$, and $\Delta z$ of the reference posture can be calculated on the basis of displacements $\Delta p1$, $\Delta p2$, and $\Delta p3$ of the peak positions on the photodetecting element group 48 and canceled out in coordinate measurement values. This enables more accurate measurements.

In the contact probe 10 according to the embodiment, posture variations of the movable body 20 that can be determined by three peak position displacements $\Delta p1$, $\Delta p2$, and $\Delta p3$ are three kinds of variations, that is, a movement in the Z-axis direction (vertical direction), a rotation around the X-axis direction, and a rotation around the Y-axis direction. Therefore, the movable body 20 has three degrees of freedom. For example, a movable body 20A in which reflection surfaces 28 are disposed on a plane that is perpendicular to the probe axis as shown in FIG. 6 has three degrees of freedom if the movable body 20A is supported so that it is not translated in the X-Y plane or does not produce a rotational displacement $\theta z$ (i.e., its degrees of freedom are thus reduced). Therefore, the wavelength detector 40 according to the invention can also be applied to a contact probe having such a movable body 20A.

In the embodiment, the probe body has the housing 60 which is enclosed by a broken line in FIG. 7A. To replace the stylus 22, the entire movable body 20 including the illumination subject portion 24 is removed. However, the configuration of the movable body is not limited to such a configuration. For example, FIG. 7B shows another movable body 20B having an illumination subject body which is composed of two members 24A and 24B which can be separated from each other in the Z-axis direction. The upper illumination subject body 24A has reflection surfaces 28 and the lower illumination subject body 24B is integral with the stylus 22. For example, the illumination subject body may be configured in such a manner that the two members 24A and 24B are provided with three V-grooves, three spheres, and a magnet(s) for causing the two members 24A and 24B attract each other. In this movable body 20B, the six degrees of freedom of the illumination subject body are nullified kinematically through 6-point contact. That is, the reflection surfaces 28 can be parts of both of the movable body 20B and the housing 60A and only the integral unit of the lower illumination subject body 24B and the stylus 22 can be removed. This configuration provides an advantage that the upper illumination subject body 24A having the reflection surfaces 28 and elastic connection members (a support plate etc.) for connecting the upper illumination subject body 24A to the housing 60A can be handled as components that are integral with the housing 60A and hence a contact probe can be manufactured at a low cost. Another advantage is that a problem relating to dust-proofness that the wavelength detector 40 should address like other non-contact detection type devices.

The illumination subjects of illumination light beams that are transmitted by the fibers are not limited to the above-described three reflection surfaces 28. FIGS. 8A-8D show another probe 110 in which the illumination subjects are four reflection surfaces 28 of a movable body 120. Or the illumination subjects may be five or more reflection surfaces. In the modification of FIGS. 8A-8D, a fiber transmission unit 134 has three fiber paths. A parallel lens group 142 is a lens array in which four lenses are arranged in line. Likewise, a diffraction grating 144 extends straightly and the photodetecting elements of a photodetecting element group 148 are arranged in line.

Figure 9A:
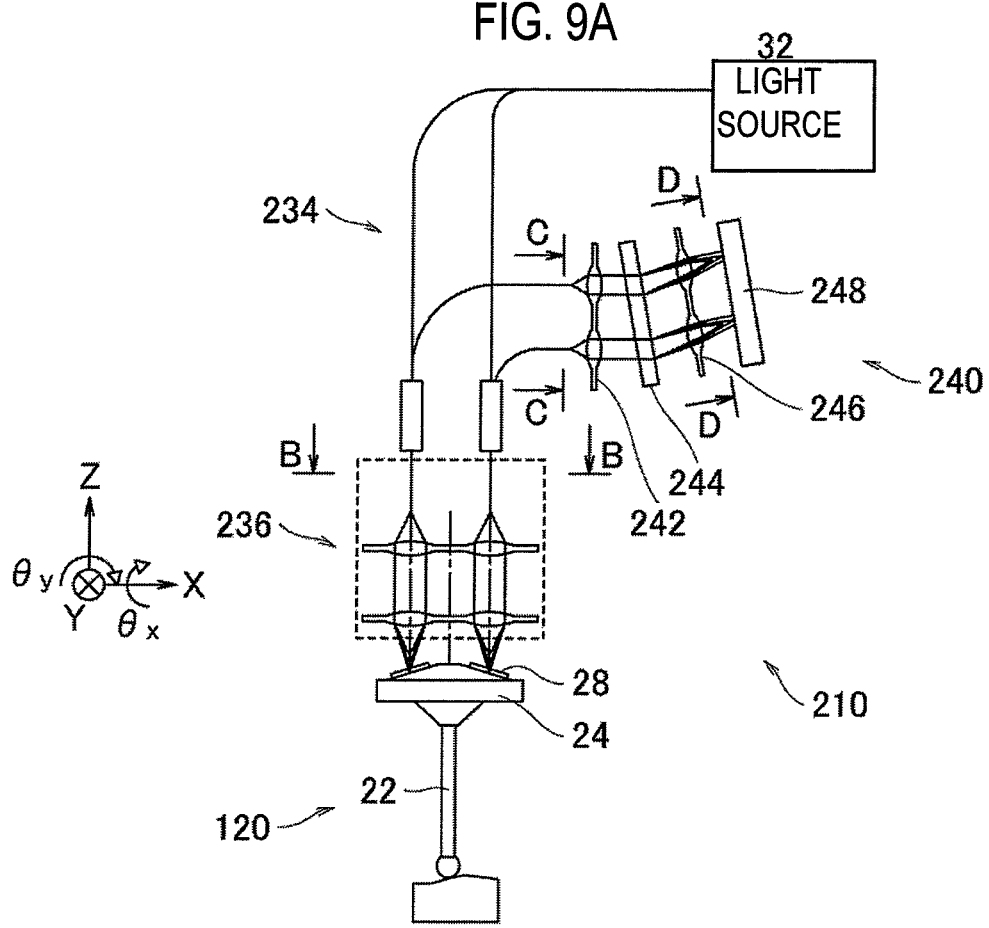
FIGS. 9A-9D show the configuration of still another modified version of the contact probe according to the embodiment in which the exits of four optical fibers which transmit four respective reflection light beams are arrange in a plane.
Figure 9B:
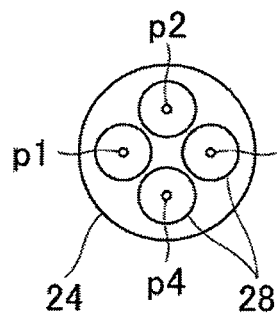
Figure 9C:
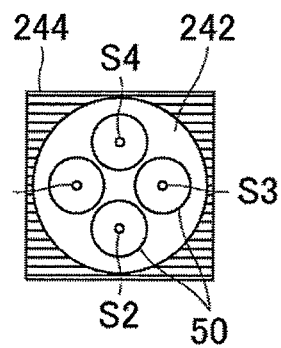

In the contact probes 10 and 110 shown in FIGS. 1A-1D and FIGS. 8A-8D, the exits S1-S3 or S1-S4 of the fibers which transmit reflection light beams are arranged in line. Alternatively, like a contact probe shown in FIGS. 9A-9D, the exits S1-S4 of the fibers may be arranged two-dimensionally in a single plane. This provides an advantage that alignment of the fibers need not be done on the side of a photodetecting element group 248. In this modification, as shown in FIG. 9C, the lenses of a parallel lens group 242 are also arranged in line and a diffraction grating 244 has such a size as to cover all of four parallel light beams coming from the parallel lens group 242.

Figure 9D:
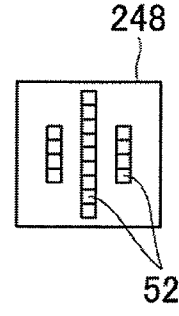

A CMOS area image sensor may be used as the photodetecting element group 248, in which case the photodetecting element group 248 is simple in structure. To realize higher-speed detection, it is preferable that the photodetecting element group 248 be configured in such a manner that four photodetecting element arrays are arranged on the surface of a substrate as shown in FIG. 9D. Each photodetecting element array is a straight arrangement of plural photodetecting elements 52 and is a line sensor, for example.

In each photodetecting element array, photodetecting elements 52 are arranged in such a direction as to cover a corresponding variation range of the exit direction of the diffraction grating 244 which depends on he wavelength. Each photodetecting element array thus serves to determine a wavelength of a corresponding diffraction light beam. To simplify alignment work to be done on the photodetecting element arrays, the photodetecting element group 248 may be such that plural photodetecting element arrays are arranged parallel with each other on a single substrate.

FIGS. 10A-10D show a further contact probe 310 in which four diffraction gratings 344A-34D are arranged in a single plane. For example, as shown in FIG. 10C, four lenses 50 of a parallel lens group 242 are arranged rotation-symmetrically with respect to the center of a circular frame member and the four diffraction gratings 344A-344D of a spectroscope element 344 are arranged with the same symmetry as the four lenses 50.

A photodetecting element group 348 may be used in which plural photodetecting element arrays are arranged perpendicularly to each other. For example, as shown in FIG. 10D, four photodetecting element arrays may be arranged so as to extend along the four respective sides of a square.

As described above, the wavelength detectors 40, 140, 240, and 340 according to the invention are advantageous not only in that the heat sources can be isolated but also in that they enable high-speed detection and can be implemented as more compact devices. Furthermore, the displacement detection by the wavelength detectors 40, 140, 240, and 340 is robust to a change in the atmospheric environment, which leads to increase in the robustness to an environmental change of probes.

As for the high-speed detection, they enable sampling at about several tens of kilohertz. As for the increase in compactness, they can be implemented so as to have a diameter of several millimeters. On the other hand, the movement range (operating stroke) of the reflection surfaces with respect to the respective condenser lenses of the second-stage lens array can be kept long. Therefore, when they are used as in internal sensor of a probe, a wide space can be secured, which leads to an advantage that the degree of freedom of mechanical designing is increased. Since the detection unit and the movable body are isolated from each other as in other non-contact interval sensors, they provide other advantages that mechanical designing can be performed easily taking into consideration maintenance work such as stylus replacement and repairs.

<Contact Probe Utilizing Polarization of Light>

The fiber transmission unit 34 shown in FIGS. 1A may be modified into a fiber transmission unit having a single fiber path by utilizing polarization of light in the contact probe 10. Such a contact probe is equipped with a light source, a fiber having a single fiber path, a reflection-surface-side polarization splitting means, a condenser lens group, a detector-side polarization splitting means, and an optical detector having a wavelength detector. A movable body, the condenser lens group, and the wavelength detector are similar to the corresponding ones shown in FIGS. 1A-1D.

The configuration of the optical detector having the wavelength detector which utilizes polarization of light will be described below briefly.

The light source supplies the fiber having a single fiber path with illumination light whose spectrum is in a prescribed wavelength range. The reflection-surface-side polarization splitting means which is disposed adjacent to the exit of the fiber having a single fiber path receives illumination light transmitted by the fiber, splits the received illumination light into light beams having three different polarization states by converting the former into the latter, and outputs the light beams having different polarization states toward the respective lenses of the first-stage lens array of the condenser lens group.

For example, the reflection-surface-side polarization splitting means may be composed of a polarizing element and a splitting element such as a splitter. More specifically, for example, white light is input to a polarizing filter to produce linearly polarized light having a prescribed polarization plane, which is split into three linearly polarized light beams. One of the three linearly polarized light beams is input to a half-wave plate to produce circularly polarized light. Another linearly polarized light beam is input to a quarter-wave plate to produce linearly polarized light whose polarization plane is perpendicular to the polarization plane of the original linearly polarized light. The three light beams having different polarization states are input to the corresponding lenses of the first-stage lens array.

The condenser lens group condenses the three light beams having different polarization states onto the corresponding reflection surfaces. Light beams reflected from the respective reflection surfaces are combined together by the reflection-surface-side polarization splitting means, and resulting light is transmitted toward the wavelength detector by the fiber having a single path. The detector-side polarization splitting means splits the reflection light transmitted by the fiber into three reflection light beams having different polarization states.

The wavelength detector detects wavelengths of the three reflection light beams having different polarization states. And the wavelength detector calculates posture information of the stylus on the basis of wavelength variations of the reflection light beams which are caused by variations of the intervals between the second-stage lens array of the condenser lens group and the three reflection surfaces.

With the above configuration, since illumination light is converted into three light beams having different polarization states upstream of the condenser lens group, the multiple-point length measurement with the movable body which is performed in the embodiment using the plural fibers can be realized using the single fiber. Since light beams reflected from the three reflection surfaces are transmitted together by the single fiber by utilizing polarization of light rather than by the three independent fibers, three reflection light beams can be increased in the uniformity of optical characteristics.

What is claimed is:

1. A wavelength detector comprising:
    a parallel lens group configured to convert light beams having partial wavelength ranges, which are extracted from three or more reflection light beams produced by irradiating with three or more illumination light beams having a spectrum in a prescribed wavelength range to three or more reflection surfaces of an illumination subject portion, into light beams that are parallel with each other using three or more lenses;
    a spectroscope element configured to receive the light beams coming from the parallel lens group, and to output the light beams in exit directions corresponding to their partial wavelength ranges, respectively;
    a detection lens group configured to condense the output light beams of the spectroscope element using three or more lenses, respectively; and
    a photodetecting element group configured to detect focusing positions of three or more light beams condensed by the detection lens group, respectively, the photodetecting element group comprising a plurality of photodetecting elements which are arranged in a single plane and cover variation ranges of the focusing positions, depending on the exit directions from the spectroscope element, of the three or more light beams condensed by the detection lens group,
    wherein the wavelength detector calculates wavelengths of the three or more light beams on the basis of the respective detected focusing positions.

2. The wavelength detector according to claim 1, wherein the photodetecting element group comprises a plurality of photodetecting element arrays which are arranged in the single plane and in each of which a plurality of photodetecting elements are arranged in line.

3. The wavelength detector according to claim 2, wherein each of the plurality of photodetecting element arrays comprises a plurality of photodetecting elements that are arranged in such a direction as to cover a variation range of the exit direction that depends on the wavelength of the corresponding output light beam of the spectroscope element, and serves for determination of a wavelength of the corresponding light beam condensed by the detection lens group.

4. The wavelength detector according to claim 3, wherein the spectroscope element is a diffraction grating.

5. The wavelength detector according to claim 2, wherein the spectroscope element is a diffraction grating.

6. The wavelength detector according to claim 1, wherein the spectroscope element is a diffraction grating.

7. A contact probe comprising:
- a stylus held so that its posture varies according to a manner of contact of its tip portion to an object to be measured;
- an optical detector configured to detect a posture of the stylus optically; and
- an illumination subject portion formed on the stylus and illuminated by the optical detector, the illumination subject portion having three or more reflection surfaces,
- wherein the optical detector comprises:
    - three or more fibers configured to transmit illumination light beams toward the respective reflection surfaces,
    - a light source configured to supply the illumination light beams having a spectrum in a prescribed wavelength range to the respective optical fibers,
    - a condenser lens group configured to condense the illumination light beams coming from the respective fibers onto the respective reflection surfaces by condenser lenses disposed on optical axes extending between the fibers and the corresponding reflection surfaces, and
    - a wavelength detector according to any one of claims 1 to 4 configured to receive reflection light beams reflected from regions of the reflection surfaces, located in the vicinities of focusing positions of components, having partial wavelength ranges, of the illumination light beams via the fibers, respectively, and to detect wavelengths of the respective reflection light beams,
- wherein the wavelength detector is configured to calculate posture information of the stylus on the basis of wavelength variations of the reflection light beams that are caused by variations of intervals between the condenser lens group and the three or more reflection surfaces, respectively, and
- wherein the contact probe acquires coordinates of a position of the contact to the object to be measured on the basis of posture information obtained by the optical detector.

8. The contact probe according to claim 7, wherein the three or more reflection surfaces are disposed on a conical surface or an inverted conical surface, whose axis coincides with a probe axis, of the illumination subject portion.

9. The contact probe according to claim 7, wherein the three or more reflection surfaces are arranged in a flat plane, perpendicular to a probe axis, of the illumination subject portion.

* * * * *